US009783112B2

(12) United States Patent
Payne

(10) Patent No.: US 9,783,112 B2
(45) Date of Patent: Oct. 10, 2017

(54) REAR WINDSHIELD IMPLEMENT STATUS HEADS-UP DISPLAY

(71) Applicant: CNH Industrial America LLC, New Holland, PA (US)

(72) Inventor: Matthew K. Payne, Thornton, CO (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/923,976

(22) Filed: Oct. 27, 2015

(65) Prior Publication Data

US 2017/0113610 A1 Apr. 27, 2017

(51) Int. Cl.
| | |
|---|---|
| *B60R 1/00* | (2006.01) |
| *G06F 3/01* | (2006.01) |
| *A01C 7/10* | (2006.01) |
| *B62D 49/06* | (2006.01) |
| *G02B 27/01* | (2006.01) |

(52) U.S. Cl.
CPC ............... *B60R 1/00* (2013.01); *A01C 7/102* (2013.01); *B62D 49/0614* (2013.01); *G06F 3/011* (2013.01); *B60R 2300/205* (2013.01); *B60R 2300/308* (2013.01); *B60R 2300/8046* (2013.01); *G02B 2027/0141* (2013.01)

(58) Field of Classification Search
None
See application file for complete search history.

(56) References Cited

U.S. PATENT DOCUMENTS

| | | | |
|---|---|---|---|
| 4,299,483 A | 11/1981 | Grove et al. | |
| 5,721,679 A * | 2/1998 | Monson | G02B 27/01 345/7 |
| 5,751,576 A | 5/1998 | Monson | |
| 5,758,941 A * | 6/1998 | Stahl | H04N 9/3185 348/E3.044 |
| 6,216,614 B1 * | 4/2001 | Wollenhaupt | A01B 79/005 111/118 |

(Continued)

FOREIGN PATENT DOCUMENTS

| | | |
|---|---|---|
| DE | 10 2008 012 638 A1 | 9/2009 |
| EP | 1 674 324 A1 | 6/2006 |
| WO | 2012/152475 A1 | 11/2012 |

*Primary Examiner* — Joseph Haley
*Assistant Examiner* — Emily Frank
(74) *Attorney, Agent, or Firm* — Rickard K. DeMille; Rebecca L. Henkel

(57) ABSTRACT

An agricultural vehicle for towing an agricultural implement or a self-propelled agricultural implement has at least two individual row elements attached to the agricultural implement. A heads-up display is operable to display an individual row element status graphic for each of the at least two individual row elements on a windshield or window of the agricultural vehicle, which may be the rear windshield and side windows. The individual row element status graphics are displayed in alignment with the at least two individual row elements as viewed by an operator of the agricultural vehicle. The individual row element status graphics contain information pertaining to the at least two individual row elements, which may be at least one measured parameter value associated with that individual row element.

18 Claims, 6 Drawing Sheets

(56) References Cited

U.S. PATENT DOCUMENTS

| | | | |
|---|---|---|---|
| 6,327,569 B1* | 12/2001 | Reep | A01B 79/005 |
| | | | 702/2 |
| 7,606,648 B2 | 10/2009 | Shepherd et al. | |
| 8,188,846 B2 | 5/2012 | Cooper et al. | |
| 8,979,424 B2 | 3/2015 | Berning et al. | |
| 2009/0189831 A1 | 7/2009 | Chevion et al. | |
| 2009/0219199 A1 | 9/2009 | Borchert et al. | |
| 2009/0225434 A1 | 9/2009 | Nicholas et al. | |
| 2010/0253594 A1* | 10/2010 | Szczerba | G01S 13/723 |
| | | | 345/7 |
| 2011/0301813 A1 | 12/2011 | Sun et al. | |
| 2013/0229524 A1* | 9/2013 | Vovkushevsky | B60R 1/00 |
| | | | 348/148 |
| 2014/0200759 A1 | 7/2014 | Lu et al. | |

* cited by examiner

REAR WINDSHIELD IMPLEMENT STATUS HEADS-UP DISPLAY

BACKGROUND OF THE INVENTION

1. Field of the Invention

The present invention relates to a heads-up display (HUD) for use in conjunction with implement status software in an agricultural vehicle towing an agricultural implement or in a self-propelled agricultural implement applying an agricultural product, such that an operator can view row-by-row implement status overlaid on the implement rows visible through the rear vehicle windshield of the agricultural vehicle or self-propelled agricultural implement.

2. Description of the Related Art

Agricultural vehicles towing an agricultural implement and self-propelled agricultural implements are commonly used to perform various agricultural functions, such as tilling, planting, spraying, and fertilizing. Often, these agricultural vehicles towing agricultural implements and self-propelled agricultural implements have individual row elements, or sections of individual row elements, that perform a function, which may rely on a proper setting and resulting measured value. For example, the individual row elements, or sections of individual row elements, may have a rate of flow of a product being applied such as a liquid, granular solid, singulated seed, bulk seed, anhydrous ammonia, or even individual plants (via a transplanter), a state of fill of a reservoir of product being applied, a working pressure of the product being applied in the case of a sprayer, a hydraulic pressure, an air pressure, a height setting, or state of engagement. Other non-limiting examples of measured values may include a rate of seed singulation, occurrence of skips, occurrence of multiples, seed spacing, seed population, or row-by-row downforce. Each of these may be measured against a target value, and may have a maximum acceptable value and/or a minimum acceptable value. Each of these may need to be monitored by the operator of the agricultural vehicle or self-propelled agricultural implement, in order to ensure that each individual row element, or section of individual row elements, performs its function as intended.

In the current precision farming market, an operator of an agricultural vehicle towing an agricultural implement or of a self-propelled agricultural implement performing an agricultural function or applying one or more agricultural product can check the function statuses of various individual row elements, or sections of individual row elements, largely only from in-cab displays like the vehicle instrument cluster, an aftermarket or Original Equipment Manufacturer touch-screen display and/or implement control box, or by simple gauges and indicators out on the implement itself, or on the individual row elements, or section of individual row elements. Each of these display mechanisms has its own inconveniences. Though the instrument cluster and touch-screen displays generally give the most precise, up-to-date status, complex calculations or feedback information across the implement width, it is difficult for an operator to visually connect the row data or row section data shown with the physical row or section out on the implement during operation. An in-cab display alert, such as a row error, a row applying outside of its intended range, or a simple confirmation of uniform application across the rows and/or nozzles, all require the operator to turn around and check the implement visually.

With the in-cab displays in the front of the cab, and the implement and/or individual row elements visible through the rear windshield, an operator is required to rotate back and forth in the seat often, as he compares the two. Additionally, bumpy field conditions and dozens of implement row elements make it hard to visually pinpoint the intended row element or section of row elements quickly. On the other hand, mechanical gauges or indicators out on the implement usually give good 'quick and dirty' feedback or indications of row or section status, but they are unable to incorporate the precise data and complex calculations that the in-cab displays are able to easily generate and display. During field operation, these gauges can become very difficult to see, as visibility can suffer due to dust, dirt, rain, and darkness. Therefore the two mechanisms, in-cab displays and on-implement gauges, leave much to be desired to fully correlate good, precise data, with specific physical row elements, or section of row elements, out on the implement.

What is needed in the art is a system for monitoring row elements in an agricultural vehicle towing an agricultural implement or in a self-propelled agricultural implement, the agricultural vehicle towed agricultural implement or self-propelled agricultural implement applying an agricultural product or performing an agricultural function, such that an operator can view the status of an individual row element, or section of rows, through the vehicle rear windshield and/or side windows, while making it easy to visually pinpoint the intended row element or section of row elements, and while correlating good, precise data with these specific physical row elements.

SUMMARY OF THE INVENTION

The present invention provides such a way to use implement status software in conjunction with a rear and/or side window HUD in an agricultural vehicle towing an agricultural implement or in a self-propelled agricultural implement, the agricultural vehicle towing an agricultural implement or self-propelled agricultural implement applying an agricultural product or performing an agricultural function, such that an operator can view the status of an individual row element, or section of row elements, overlaid on the visible implement row elements, or section of row elements, through the vehicle rear windshield and/or side windows. This makes it easy for the operator to visually pinpoint the intended row element or section of row elements, while correlating good, precise data with these specific physical row elements. For the purposes of this disclosure, row elements shall be construed to include elements that do not necessarily align with actual planted rows, such as sprayer nozzles, which may overlap multiple actual planted rows, or may be provided at more than one sprayer nozzle per actual planted row. In this case, the implement status software in conjunction with the rear and/or side window HUD allows the operator to view the status of the individual row elements, i.e.—the sprayer nozzles, overlaid on the visible implement row elements, the sprayer nozzles, independent of the location of the actual planted rows.

The present invention communicates the status of individual row elements, or section of row elements, as clearly as possible to the operator of the agricultural vehicle and/or self-propelled agricultural implement by providing implement HUD graphics that line up directly with each actual individual row element, or section of row elements, as sighted from the operator's seat in the vehicle cab. All implement status verifications, feedback analysis, and calculations, including those for the individual row elements performing an agricultural function or applying one or more agricultural product, may be done within the vehicle or implement control module, and then sent to the in-cab HUD display hardware as well as to tractor gauges or implement touchscreen for display to the operator. Alternately, other vehicle or implement modules may process certain signals and/or feedback, after which the vehicle or implement control module or the in-cab HUD display hardware performs calculations to translate the raw data into readable, meaningful text, indicators, and alerts. This is then sent to the HUD for projection onto the rear windshield and/or side windows.

HUD hardware and additional software is provided to support configuring the projected HUD display to align with the actual implement individual row elements. Information provided by the HUD may be in addition to the output to the operator provided by existing and future in-cab display products, as the user may still require an interface to interact with displays. Alternately, the HUD may fully replace some touchscreen display functions currently provided by in-cab display products.

The windows that the HUD displays may be fully user definable windows (UDW's). For example, the operator may choose which parameters are displayed for a given set of individual row elements, or section of row elements, such as the rate of flow of a product being applied such as a liquid, granular solid, singulated seed, bulk seed, anhydrous ammonia, or individual plants, the state of fill of the reservoir of a product being applied, a working pressure of the product being applied in the case of a sprayer, a hydraulic pressure, an air pressure, a height setting, a state of engagement, a rate of seed singulation, occurrence of skips, occurrence of multiples, seed spacing, seed population, or row-by-row downforce, as non-limiting examples. The parameters of the individual row elements, or sections of row elements, may be numerically and/or graphically displayed, and further indicators may be provided, such as reported faults or alerts. This information is presented by the HUD so that it is spatially correlated with the individual row units or section of row units represented. Other data unrelated to parameters for the given set of individual row elements may be included by the operator within the HUD display, along with such parameters for the individual row elements or sections of row elements. In this way, the operator may observe the data provided regarding the parameters for the individual row elements or sections of row elements, without entirely losing sight of such information as vehicle and/or implement data such as might otherwise be displayed on the vehicle instrument panel or implement touch screen, for example.

This invention may be used for towed or self-propelled flow and application implements like planters, seeders, sprayers, spreaders, and strip-till liquid, granular or anhydrous ammonia applicators. This invention may further be used for nearly any agricultural or construction application or operation, including but not limited to harvesting, swathing, mowing, hay or forage conditioning, baling, surface leveling, sub-surface drainage, and others.

The HUD hardware itself may use any of several different embodiments, including but not limited to a projection system using a selective refractive vehicle rear windshield and/or side windows, a reflection-enhancing coating applied to the vehicle rear windshield and/or side windows, or a screen pressed onto the vehicle rear windshield and/or side window glass. While the present invention has been described thus far for agricultural vehicles towing agricultural implements or self-propelled agricultural implements having individual row elements or sections of row elements to the rear of the operator cab, the agricultural vehicle towing an agricultural implement or the self-propelled agricultural implement applying one or more agricultural product or performing an agricultural function, the present invention may further be used on a future agricultural vehicle applying an agricultural product or performing an agricultural function using individual row elements or sections of row elements forward of the operator cab. In this case, the HUD display of information regarding the status of the individual row elements, or sections of row elements, overlaid on the visible row elements would occur on the front windshield of the agricultural vehicle.

The present invention may use a calibration process, together with application of calibration and tuning logic to ensure that the display of information regarding each individual row element, or section of row elements, as viewed by the operator will line up properly with each individual row element or section on the agricultural implement towed by the agricultural vehicle and/or each individual row element or section on the self-propelled agricultural implement. In the case of a tractor towing an agricultural implement having individual row elements or sections of row elements, this calibration process may involve sensing hardware and software for determining the position of the towed implement relative to the tractor. The calibration process may be partly manual, requiring the operator to enter information regarding the implement and individual row elements, along with information regarding the operator, such as height and preferred seating position. Alternately, the calibration process may be largely automated, so that the HUD system obtains information from the agricultural implement towed by the agricultural vehicle and/or from the self-propelled agricultural implement automatically, either from control systems or modules associated with the agricultural implement towed by the agricultural vehicle and/or the self-propelled agricultural implement, or by direct recognition of the relevant individual row elements or machine identifiable indicators associated with the individual row elements. Further, the HUD system may incorporate technologies such as eye recognition, so that the HUD displayed images are automatically adjusted for variations in operator height and seating position.

The HUD camera or projector itself may be located on the ceiling of the operator cab of the agricultural vehicle or self-propelled agricultural implement, or may be located on the back of the operator seat, or in any other convenient unobstructed location.

The invention in one form is directed to an agricultural vehicle for towing an agricultural implement. The agricultural implement has at least two individual row elements. A heads-up display is operable to display an individual row element status graphic for each of the at least two individual row elements on a windshield or window of the agricultural vehicle. The individual row element status graphics are displayed in alignment with the at least two individual row elements as viewed by an operator of the agricultural vehicle. The individual row element status graphics contain information pertaining to the at least two individual row elements.

The invention in another form is directed to a self-propelled agricultural implement. The self-propelled agricultural implement has at least two individual row elements. A heads-up display is operable to display an individual row element status graphic for each of the at least two individual row elements on a windshield or window of the self-propelled agricultural implement. The individual row element status graphics are displayed in alignment with the at least two individual row elements as viewed by an operator of the self-propelled agricultural implement. The individual row element status graphics contain information pertaining to the at least two individual row elements.

The invention in another form is directed to a heads-up display for use with an agricultural implement having at least two individual row elements. At least one projector is operable to display an individual row element status graphic for each of the at least two individual row elements on a windshield or window. The individual row element status graphics are displayed in alignment with the at least two individual row elements as viewed by an operator. The individual row element status graphics contain information pertaining to the at least two individual row elements.

An advantage of the present invention is that it provides clearer, more illustrative agricultural implement feedback, visually connected directly to individual row elements or sections of row elements.

A further advantage of the present invention is that it has the ability to combine the positive characteristics of mechanical gauges or indicators located directly on the implement, being their direct and immediate association with the relevant individual row element or section of row elements, while eliminating the visibility problem. At the same time, the invention provides the ability to incorporate precise data and complex calculations as a result of being in the cab and near to the operator, such that the display of precise and complex data can be quickly and readily assimilated by the operator. The HUD system is further able to receive precise feedback and perform calculations, then project the resultant status data or graphic feedback directly in-line or overlaid on the physical individual row elements or sections of row elements, as seen through the operator's back windshield. In this way, precise row-by-row data is connected directly and visually with the physical agricultural function being performed or agricultural products being applied.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
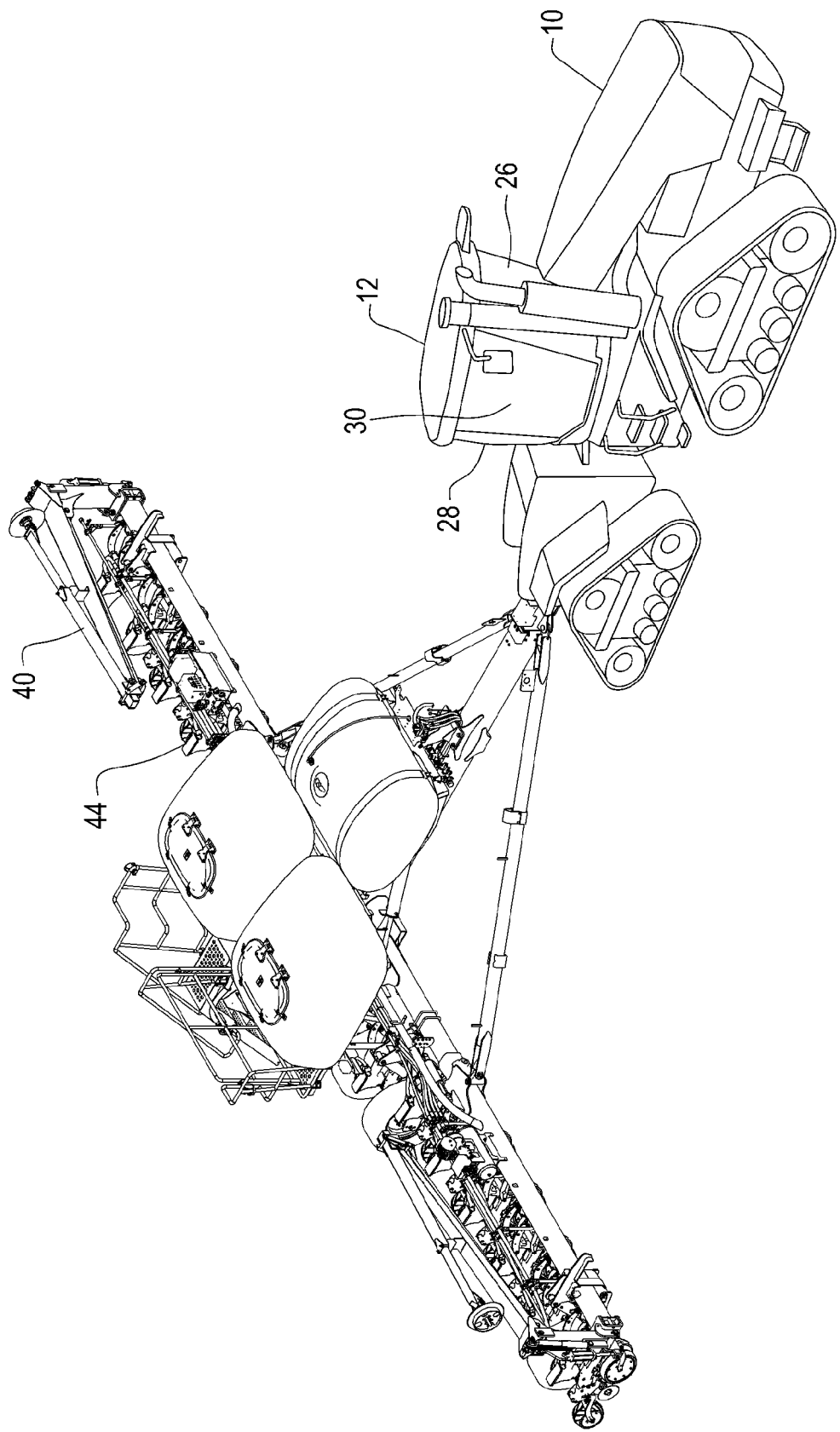
FIG. 1 is an isometric view of an agricultural vehicle towing an agricultural implement.
Figure 2:
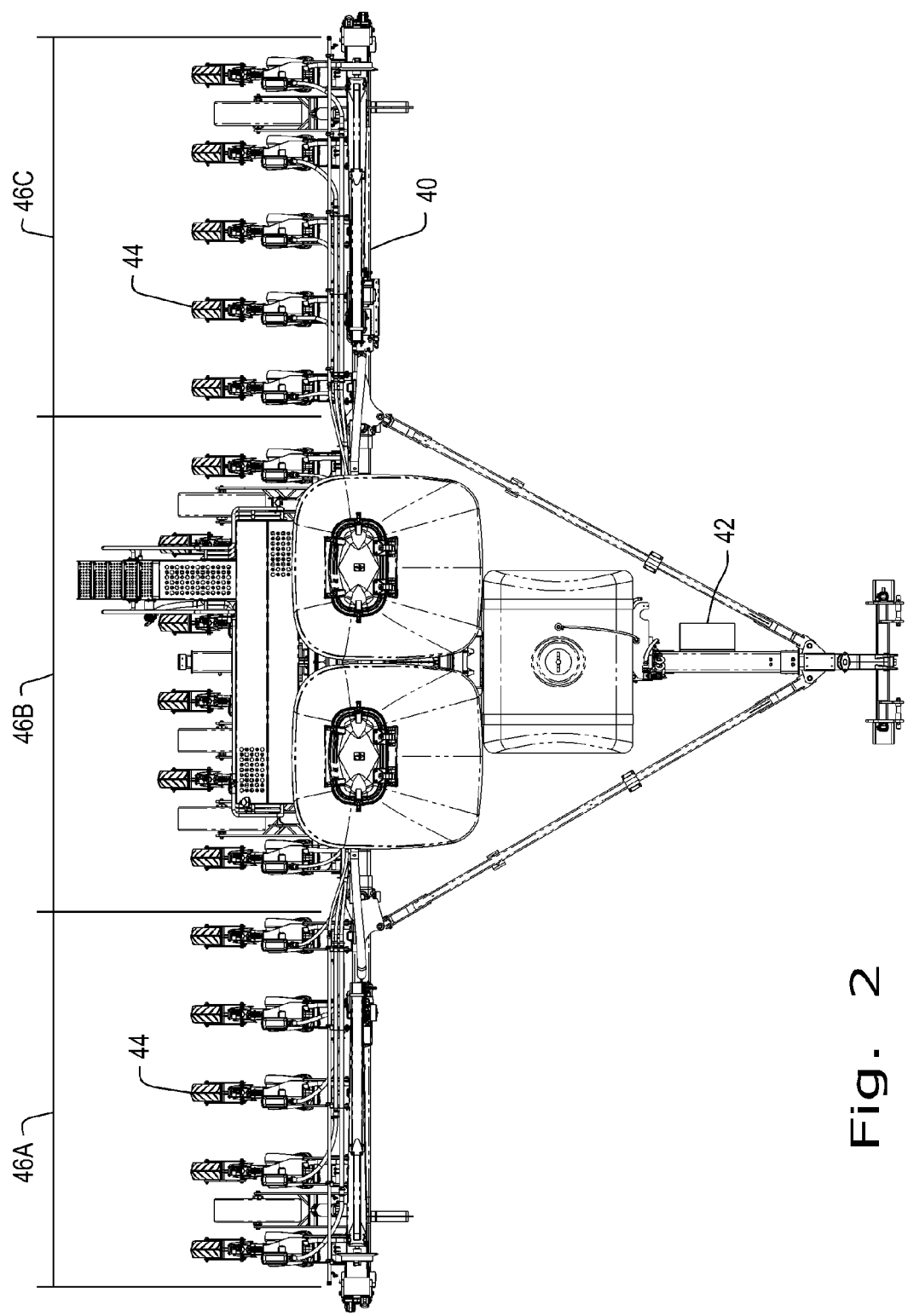
FIG. 2 is a top view of an agricultural implement.

Referring now to the drawings, and more particularly to FIG. 1, there is shown an isometric view of an agricultural vehicle 10 towing an agricultural implement 40. The agricultural vehicle 10, in this case a tractor, is provided with an operator cab 12 having a front windshield 26, a rear windshield 28, and side windows 30. The agricultural implement 40 possesses multiple individual row elements 44 for performing an agricultural function or applying one or more agricultural products. In this case, a planter is illustrated, so that the agricultural function of the agricultural implement 40 is planting seeds. FIG. 2 shows further detail of the agricultural implement 40, including the multiple individual row elements 44 and an implement control module 42. The multiple individual row elements 44 may be grouped in sections 46A, 46B, and 46C, for the purpose of grouping control and monitoring functions.

Figure 3:
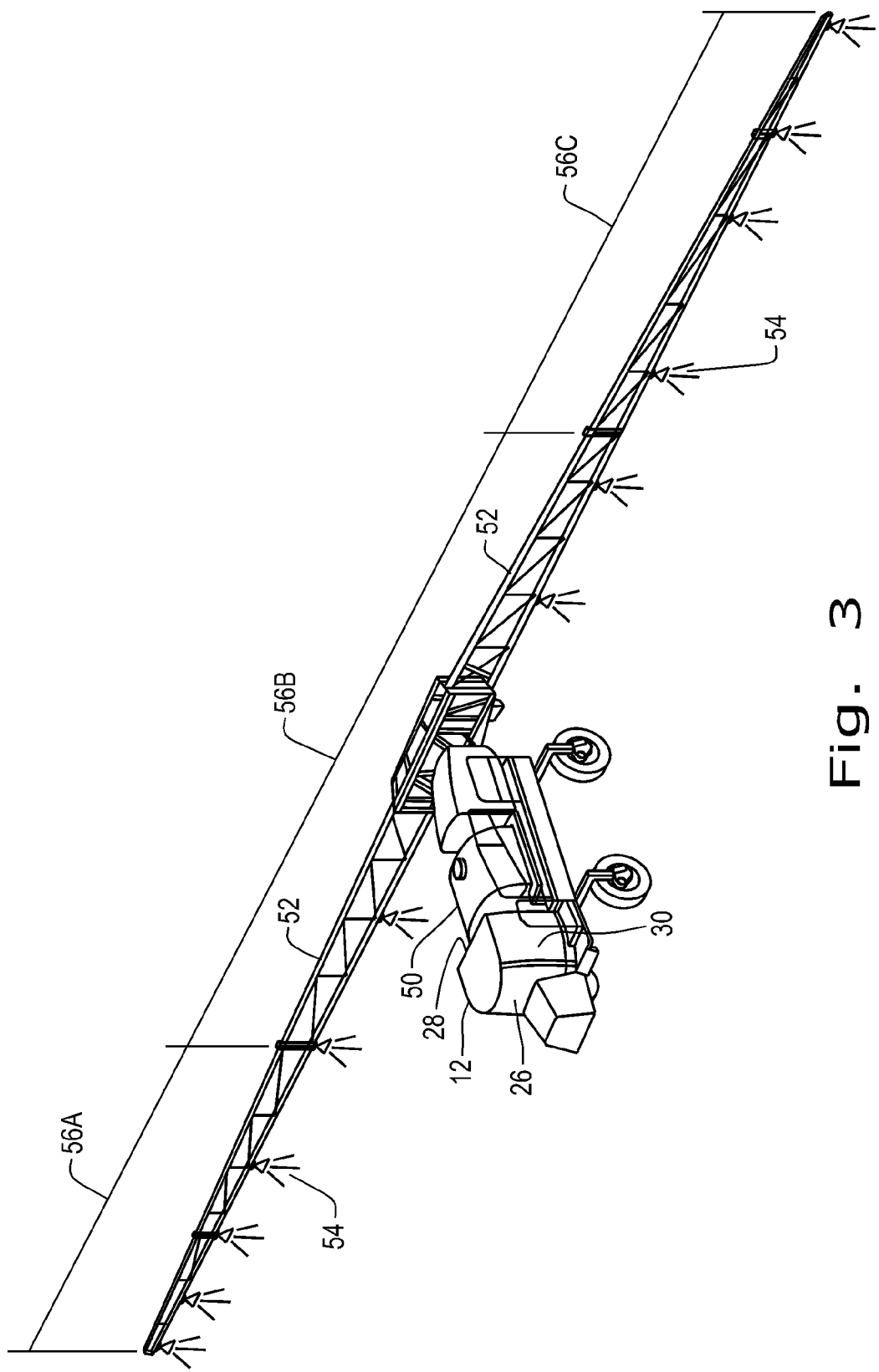
FIG. 3 is an isometric view of a self-propelled agricultural implement.

FIG. 3 shows an isometric view of a self-propelled agricultural implement 50 having booms 52 carrying individual row elements 54. In this case, a sprayer is illustrated, so that the agricultural function of the self-propelled agricultural implement 50 is spraying liquid agricultural products. The self-propelled agricultural implement 50 is again provided with an operator cab 12 having a front windshield 26, a rear windshield 28, and side windows 30.

Figure 4:
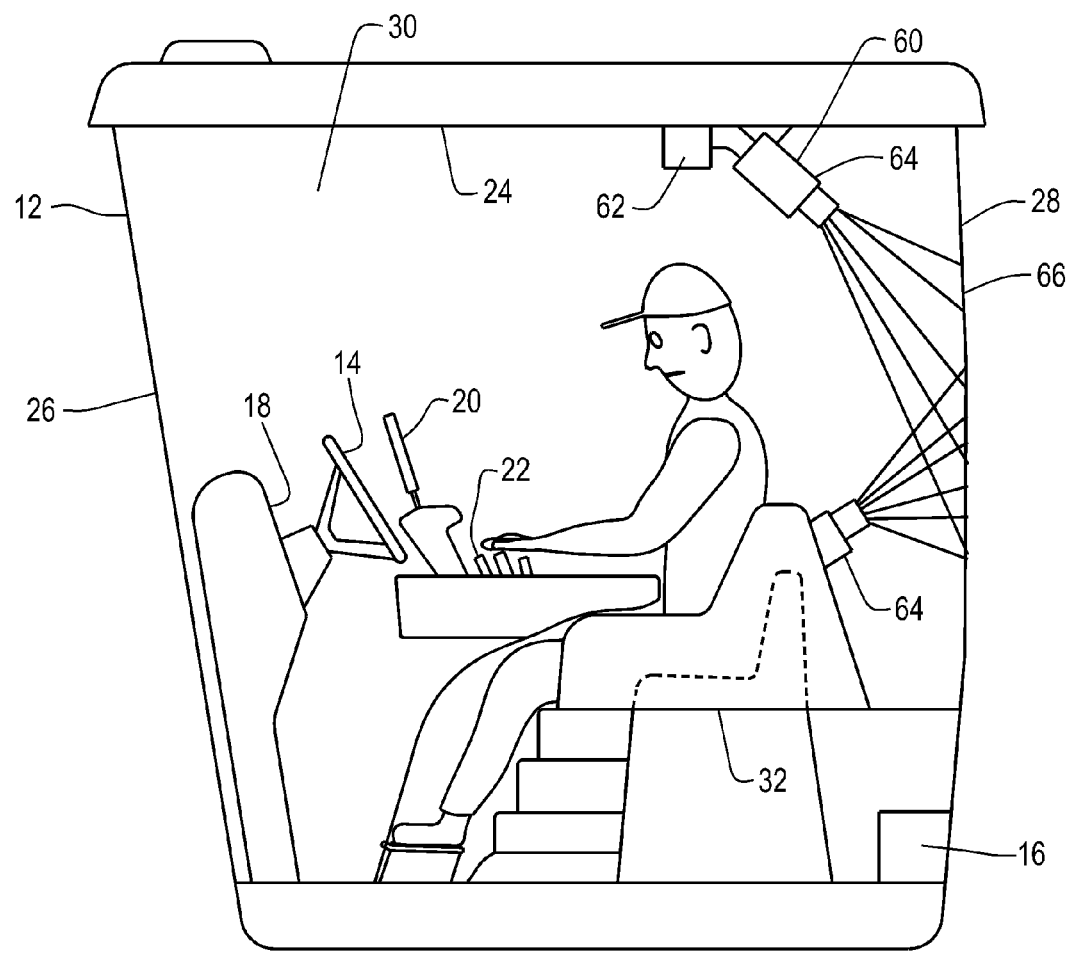
FIG. 4 is a detail side view of an interior of an operator cab of an agricultural vehicle or self-propelled agricultural implement showing an embodiment of the present invention, being a HUD.

FIG. 4 now shows a detail view of the inside of an operator cab 12 of either an agricultural vehicle 10 or of a self-propelled agricultural implement 50 possessing an embodiment of the present invention, a HUD 60. The operator cab 12 is provided with an operator seat 32 for the operator, along with vehicle controls 14, and an instrument cluster 18 primarily for the monitoring of vehicle information. Additional implement controls 22 and a touchscreen display 20 are provided for controlling and monitoring agricultural functions, such as the operation of an agricultural implement. The operator cab 12 is further provided with a ceiling 24, a front windshield 26, a rear windshield 28, and side windows 30. The HUD 60 has HUD hardware 62 and at least one HUD camera and/or projector 64 that is operable to project an image 66 onto at least the rear windshield 28, and possibly onto the side windows 30. The at least one HUD camera and/or projector 64 is shown mounted in two alternative locations, one being on the ceiling 24, and the other being on the back of the operator seat 32. The HUD hardware 62 may further be connected to a vehicle control module 16.

Figure 5:
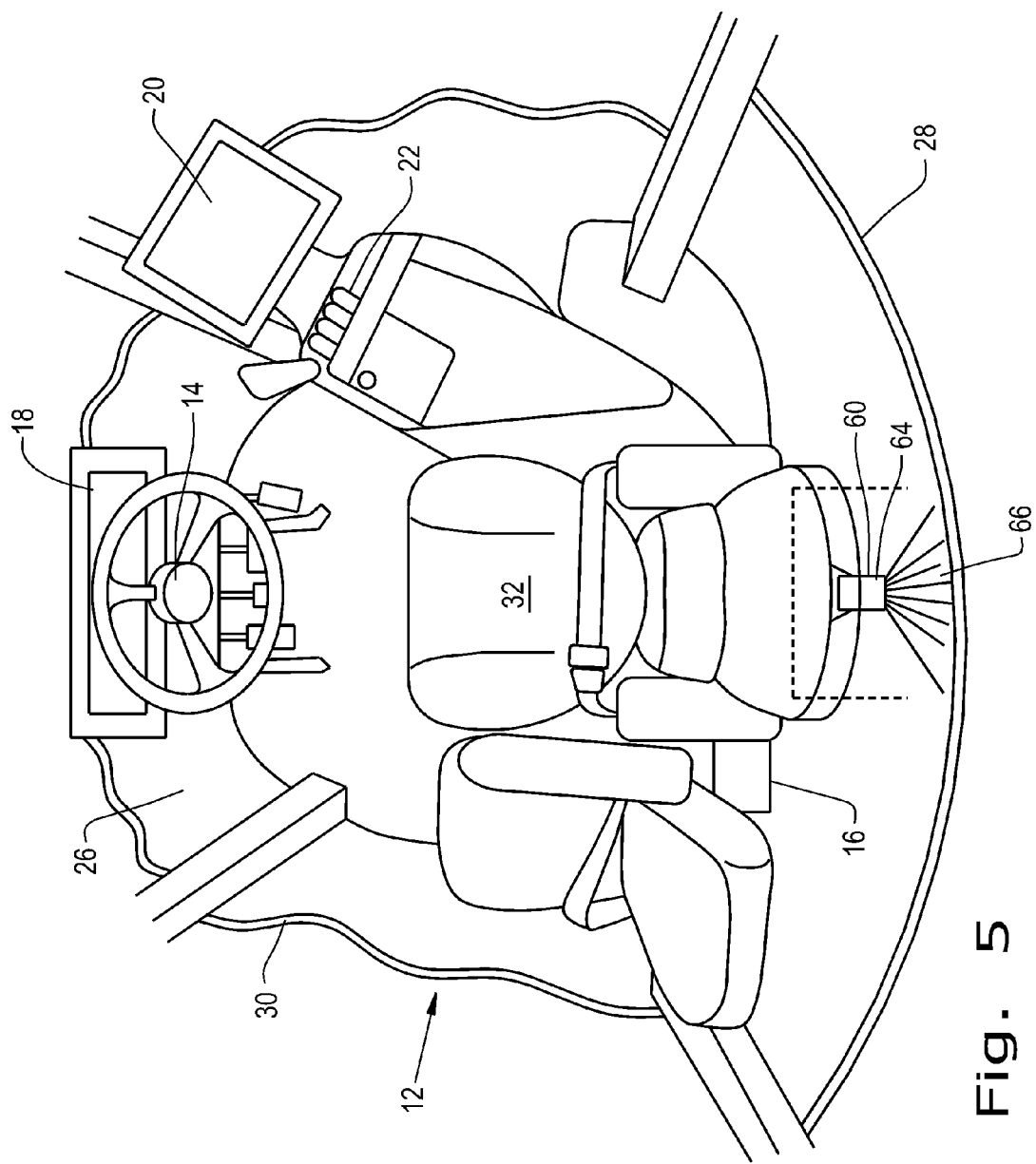
FIG. 5 is a detail top view of an interior of an operator cab of an agricultural vehicle or self-propelled agricultural implement showing an embodiment of the present invention, being a HUD.

FIG. 5 shows a top detail view of the inside of the operator cab 12 of either an agricultural vehicle 10 or of a self-propelled agricultural implement 50 possessing an embodiment of the present invention, a HUD 60. The operator cab 12 is again provided with an operator seat 32 for the operator, along with vehicle controls 14, and an instrument cluster 18 primarily for the monitoring of vehicle information. Additional implement controls 22 and a touchscreen display 20 are again provided for controlling and monitoring agricultural functions, such as the operation of an agricultural implement. The operator cab 12 is further provided with a front windshield 26, a rear windshield 28, and side windows 30. The HUD 60 has at least one HUD camera and/or projector 64 that is operable to project an image 66 onto at least the rear windshield 28, and possibly onto the side windows 30. In this embodiment, the HUD camera and/or projection 64 is mounted on the back of the operator seat 32.

Figure 6:
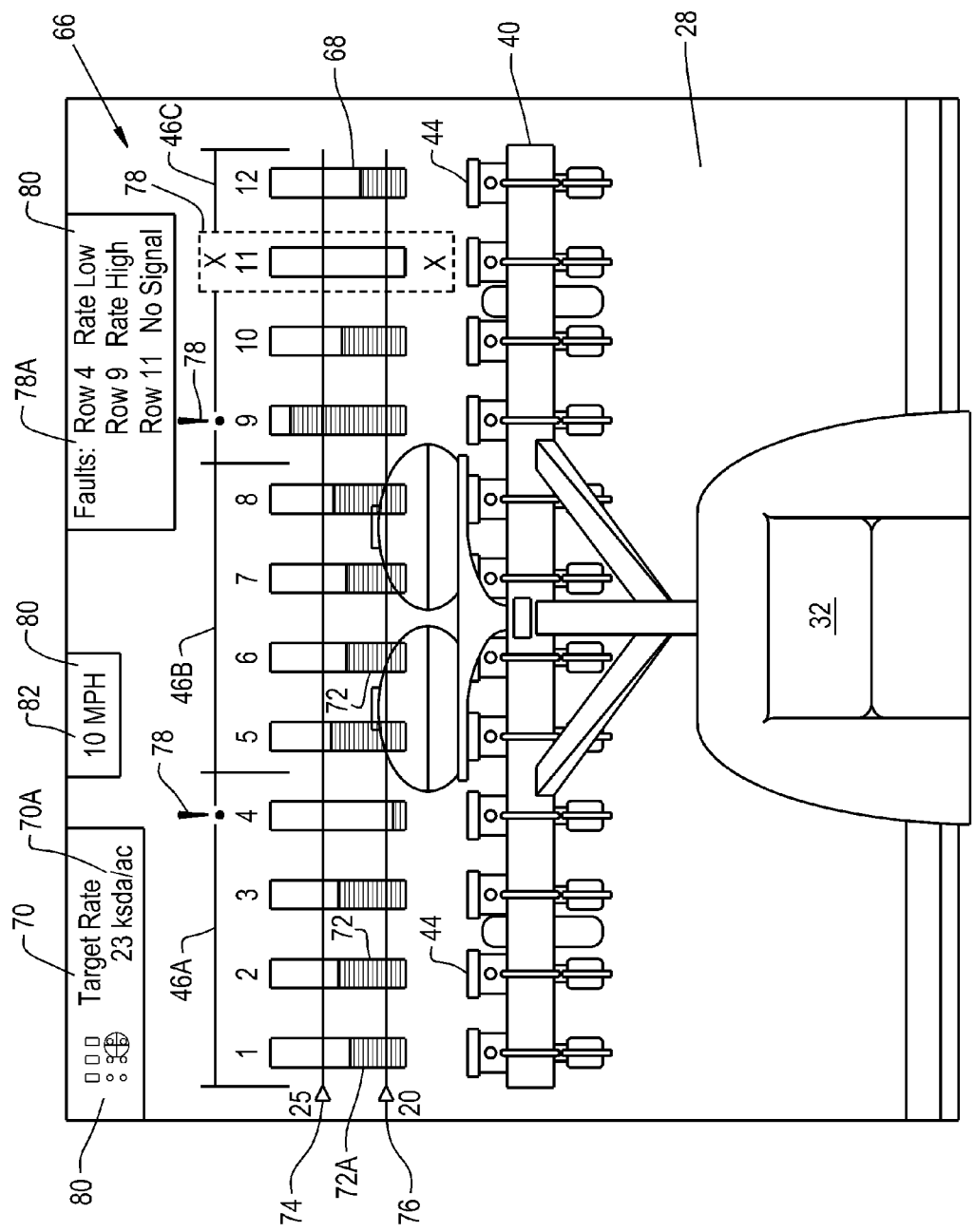
FIG. 6 is a graphical representation of an embodiment of the present invention, being a projected image displayed by the HUD as seen by an operator sitting in the operator seat of an agricultural vehicle or self-propelled agricultural implement.

FIG. 6 shows a view of the projected image 66 as seen by an operator sitting in the operator seat 32. The projected image 66 is projected on the rear windshield 28 of the operator cab so that the individual row element status graphics 68 align with the individual row elements 44 of the agricultural implement 40. If embodied on a self-propelled agricultural implement, the projected image 66 would be projected on the rear windshield 28 and/or side windows 30 (not shown in FIG. 6) so that the individual row element status graphics 68 would align with the individual row elements 54 on booms 52 (not shown in FIG. 6). Here, however, the HUD 60 is being used in an agricultural vehicle 10 towing an agricultural implement 40 so that the individual row element status graphics 68 align with the individual row elements 44 of the agricultural implement 40.

Each of the individual row element status graphics 68 contains information regarding the agricultural function being performed by the individual row elements 44 of the agricultural implement 40. In this case, the agricultural implement 40 being a planter, the individual row element status graphics 68 portray a measured parameter value 72 being a rate of flow 72A of agricultural product being applied, i.e.—seeds. Lines representing a maximum acceptable value 74 and a minimum acceptable value 76 give reference to the measured rate of flow 72A. Although illustrated as being used with a planter, the agricultural implement 40 having individual row elements, or the self-propelled agricultural implement 50 having individual row elements 54, may perform any of a number of previously mentioned functions, so that the measured parameter value 72 may instead be a working product pressure, a height or state of engagement of the individual row element, the state of fill of a reservoir attached to the individual row element, an air pressure, or a hydraulic pressure, as non-limiting examples.

If the measured parameter value 72 exceeds the maximum acceptable value 74 or drops beneath the minimum acceptable value 76, the projected image 66 may display an alert 78. In the case of the planter illustrated in FIG. 6, the individual row element status graphic 68 for individual row elements 44 number 4 has displayed an alert 78 due to the rate of flow 72A of seeds dropping beneath the minimum acceptable value 76. The individual row element status graphic 68 for individual row elements 44 number 9 has displayed an alert 78 due to the rate of flow 72A of seeds exceeding the maximum acceptable value 74. The individual row element status graphic 68 for individual row elements 44 number 11 has displayed an alert 78 due to loss of a reporting signal from the individual row elements 44 number 11.

Individual row elements 44 may be further grouped together in sections 46A, 46B, and 46C, so that similar or additional data may be reported for the individual row elements 44 of each of the sections collectively. The HUD may further provide an operator the ability to use UDW's 80. As shown in FIG. 6, the operator has utilized UDW's 80 to display in one such UDW 80 a setting or target parameter value 70 being a rate of flow 70A of seeds. In another UDW 80, the operator has chosen to display specific row errors or faults 78A, in order to give further explanation to the alerts 78. In another UDW 80, the operator has chosen to display additional vehicle information 82, in this case the speed of the agricultural vehicle.

In this way, more illustrative agricultural implement feedback and information is provided, directly visually connected to individual row elements or sections of row elements. Display of precise and complex data can therefore be quickly and readily assimilated by the operator.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural vehicle for towing an agricultural implement, the agricultural implement having at least two individual row elements, comprising:
   a cab comprising an operator seat and a rear windshield, wherein the at least two individual row elements of the agricultural implement are viewable by an operator seated in the operator seat through the rear windshield; and
   a heads-up display operable to display an individual row element status graphic for each of the at least two individual row elements on the rear windshield at a location on the rear windshield such that the row element status graphic for each individual row element displayed on the rear windshield is aligned with the corresponding individual row element as viewed by the operator through the rear windshield, wherein the individual row element status graphics contains information pertaining to the at least two individual row elements.

2. The agricultural vehicle of claim 1, wherein:
   said individual row element status graphic for each of the at least two individual row elements further portrays at least one measured parameter value associated with that individual row element.

3. The agricultural vehicle of claim 2, wherein:
   said at least one measured parameter value being one of a rate of flow, a state of fill of a reservoir, a working pressure, a height, a state of engagement, a rate of seed singulation, an occurrence of skips, an occurrence of multiples, seed spacing, seed population, and a row by row downforce.

4. The agricultural vehicle of claim 2, wherein:
   said heads-up display being further operable to display on the rear windshield an acceptable value range in conjunction with said individual row element status graphics.

5. The agricultural vehicle of claim 4, wherein:
   said heads-up display being further operable to display on the rear windshield an alert, row error, or fault in proximity with an individual row element status graphic when the individual row element with which that individual row element status graphic is aligned exceeds said acceptable value range.

6. The agricultural vehicle of claim 1, wherein:
   said heads-up display being further operable to display on the rear windshield user defined windows, said user defined windows allowing the display of additional information pertaining to at least one of said agricultural vehicle, said agricultural implement, and said individual row elements.

7. A self-propelled agricultural implement, the self-propelled agricultural implement having at least two individual row elements, comprising:
- a cab comprising an operator seat and a rear windshield, wherein the at least two individual row elements of the agricultural implement are viewable by an operator seated in the operator seat through the rear windshield; and
- a heads-up display operable to display an individual row element status graphic for each of the at least two individual row elements on the rear windshield at a location on the rear windshield such that the row element status graphic for each individual row element displayed on the rear windshield is aligned with the corresponding individual row element as viewed by operator through the rear windshield, wherein the individual row element status graphics contains information pertaining to the at least two individual row elements.

8. The self-propelled agricultural implement of claim 7, wherein:
- said individual row element status graphic for each of the at least two individual row elements further portrays at least one measured parameter value associated with that individual row element.

9. The self-propelled agricultural implement of claim 8, wherein:
- said at least one measured parameter value being one of a rate of flow, a state of fill of a reservoir, a working pressure, a height, a state of engagement, a rate of seed singulation, an occurrence of skips, an occurrence of multiples, seed spacing, seed population, and a row by row downforce.

10. The self-propelled agricultural implement of claim 8, wherein:
- said heads-up display being further operable to display on the rear windshield an acceptable value range in conjunction with said individual row element status graphics.

11. The self-propelled agricultural implement of claim 10, wherein:
- said heads-up display being further operable to display on the rear windshield an alert, row error, or fault in proximity with an individual row element status graphic when the individual row element with which that individual row element status graphic is aligned exceeds said acceptable value range.

12. The self-propelled agricultural implement of claim 7, wherein:
- said heads-up display being further operable to display on the rear windshield user defined windows, said user defined windows allowing the display of additional information pertaining to at least one of said self-propelled agricultural implement and said individual row elements.

13. A heads-up display for use with an agricultural implement having at least two individual row elements, comprising:
- a cab comprising an operator seat and a rear windshield, wherein the at least two individual row elements of the agricultural implement are viewable by an operator seated in the operator seat through the rear windshield; and
- at least one projector operable to display an individual row element status graphic for each of the at least two individual row elements on the rear windshield at a location on the rear windshield such that the row element status graphic for each individual row element displayed on the rear windshield is aligned with the corresponding individual row element as viewed by the operator through the rear windshield, wherein the individual row element status graphics containing information pertaining to the at least two individual row elements.

14. The heads-up display of claim 13, wherein:
said individual row element status graphic for each of the at least two individual row elements further portrays at least one measured parameter value associated with that individual row element.

15. The heads-up display of claim 14, wherein:
said at least one measured parameter value being one of a rate of flow, a pressure, a height, or a state of engagement.

16. The heads-up display of claim 14, wherein:
said at least one projector being further operable to display on the rear windshield an acceptable value range in conjunction with said individual row element status graphics.

17. The heads-up display of claim 16, wherein:
said at least one projector being further operable to display on the rear windshield an alert, row error, or fault in proximity with an individual row element status graphic when the individual row element with which that individual row element status graphic is aligned exceeds said acceptable value range.

18. The heads-up display of claim 13, wherein:
said at least one projector is further operable to display on the rear windshield user defined windows, said user defined windows allowing the display of additional information.

* * * * *